April 14, 1942.    T. M. THOMAS ET AL    2,280,014
CABLE LAYING IMPLEMENT
Filed Jan. 15, 1940    2 Sheets-Sheet 1

April 14, 1942.  T. M. THOMAS ET AL  2,280,014
CABLE LAYING IMPLEMENT
Filed Jan. 15, 1940   2 Sheets-Sheet 2

INVENTORS:
Thomas M. Thomas,
C. Herold Russell, & Oscar P. Boff
BY
ATTORNEYS.

Patented Apr. 14, 1942

2,280,014

UNITED STATES PATENT OFFICE 2,280,014

CABLE LAYING IMPLEMENT

Thomas M. Thomas, Huntington Park, Cecil Herold Russell, Maywood, and Oscar P. Robb, Los Angeles, Calif., assignors to Killefer Manufacturing Corporation, Los Angeles, Calif., a corporation of California Application January 15, 1940, Serial No. 313,860

17 Claims. (Cl. 111—5)

The present invention relates generally to wheeled implements and more particularly to implements of the type having a longitudinally extending frame supported on vertically swingable crank axles for raising and lowering the frame relative to the ground. The invention has particular application in implements for laying cable of the type having a downwardly projecting standard or tool carrying shank for cutting a slot in the ground and having a tubular cable guide supported on the rear edge of the standard through which a cable is fed as the implement moves forwardly, from a reel carried on the frame. It is frequently, if not usually, desirable to lay an electric cable alongside a curb, a fence, or a wall in close proximity thereto and thus it is desirable not only to have the tool shank located closely adjacent to one of the supporting wheels but to be able to move the tool shank from one side of the implement to the other and to position the shank adjacent either of the supporting wheels selectively, depending upon which side of the line of travel the curb or fence is located.

The principal object of our invention, therefore, relates to the provision of new and improved means for shifting the ground working tool laterally relative to the supporting truck. We are, of course, aware that it is not broadly new to move a ground working implement laterally to different positions of adjustment as this has been done for many years in certain types of agricultural implements. In order to avoid side draft, however, and to facilitate the propulsion of the implement, it is advisable to shift the entire draft frame laterally with the implement standard. Accordingly, it is a more specific object of our invention to provide means for readily shifting the entire implement draft frame laterally relative to the supporting truck.

Inasmuch as the implement frame usually carries adjusting mechanism for regulating the depth of operation of the ground engaging tool, it is a further object of the present invention to provide a slidable connection between the depth control mechanism and the laterally shiftable frame and the wheel supporting crank axles, relative to which the frame is shifted so that the depth adjusting mechanism is equally effective in any position of lateral adjustment of the frame relative to the wheels.

Still another object of this invention relates to the provision in an implement of the type which obtains power from the supporting wheel for raising the frame relative to the ground, of an adjustment by means of which the point at which the lifting mechanism is disconnected from the wheels can be set at the proper point. The proper point for effecting such disengagement is immediately after the frame has been locked in raised position relative to the crank axle.

These and other objects and advantages will be made apparent by a consideration of the following description, reference being had to the drawings appended hereto, in which—

Figure 1:
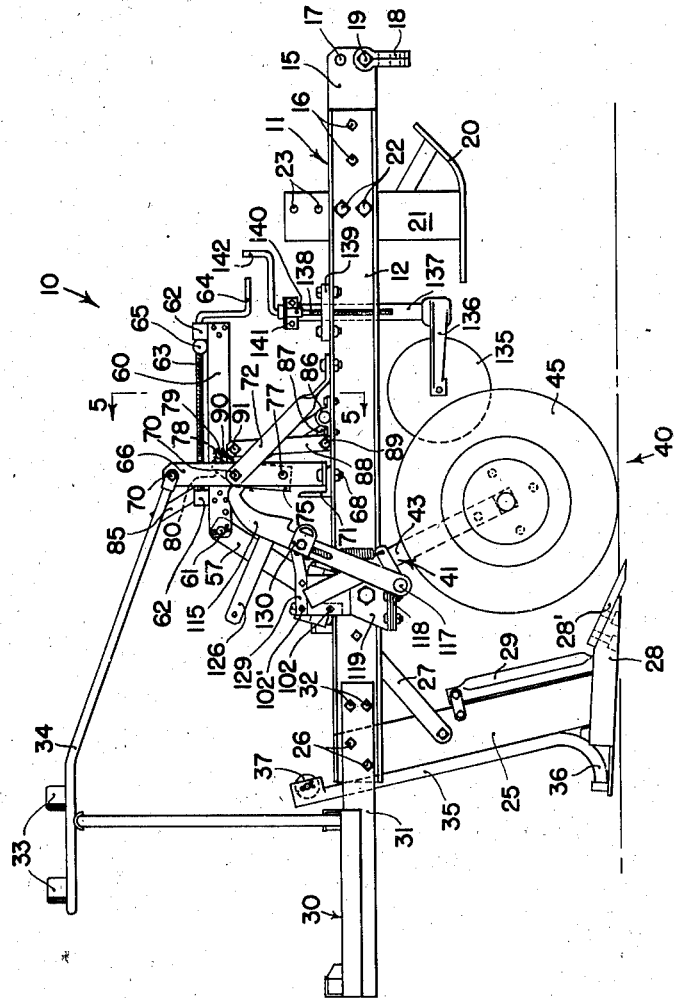
Figure 1 is a side elevation of a cable laying implement.
Figure 5:
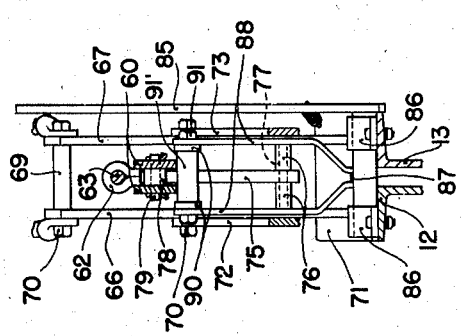
Figure 5 is a sectional elevational view taken along a line 5—5 in Figure 1.

Referring now to the drawings, the cable pulling implement, indicated in its entirety by reference numeral 10, comprises a draft frame 11 including a pair of longitudinally extending channel beams 12, 13 disposed adjacent each other in parallel relation and bolted rigidly together, but with spacing means disposed therebetween to provide a slot 14 between the two beams. At the forward end of the frame a draft plate 15 is disposed between the two beams 12, 13 and provides one of the spacing means referred to above. The plate 15 is rigidly connected to the beams by bolts 16 and is provided at its forward end by a plurality of vertically spaced apertures 17 to any one of which a draft clevis 18 can be connected by a bolt 19. The draft clevis 18 provides means for connecting the implement with a tractor, in which case the forward end of the frame is supported on the tractor drawbar. Frequently, however, this type of implement is drawn by means of a cable pulled by a suitable winch, in which case it is necessary to support the forward end of the frame on a ground engaging shoe 20 rigidly connected at the lower end of a shank 21 in the form of a plate which extends through the slot 14 between the beams 12, 13. The plate 21 is bolted to the beams by means of a pair of bolts 22 and the plate 21 is provided with a plurality of holes 23 to receive the bolts 22 in various positions of vertical adjustment.

At the rear end of the frame is disposed a downwardly extending tool carrying standard 25 in the form of a plate disposed between the beams 12, 13 and forming another spacing means therefor. The standard 25 is rigidly fixed to the beams 12, 13 by means of a pair of bolts 26 and is braced by a diagonal brace 27 bolted to the standard 25 and to the beams 12, 13 at opposite ends thereof. At the lower end of the standard 25 is fixed a burrowing tool 28 having a removable point 28' which forms a small tunnel in the ground of a size adapted to receive the cable which is being laid. A sharp-edged cutting tool 29 is fastened along the front edge of the standard 25 above the tool 28 for the purpose of cutting a narrow slot through the ground to permit the passage of the tool standard 25.

A reel supporting platform 30 is supported at the rear of the frame by means of a pair of diverging beam members 31 which are connected to the rear ends of the beams 12, 13 by the bolts 26, 32 and diverging rearwardly therefrom beneath the platform 30 to which they are connected by suitable means (not shown). The platform 30 is wide enough to receive and support a pair of wire-carrying reels from which the wire or cable is guided through a pair of upper guides 33 carried on a supporting framework 34 and from these guides the cable passes downwardly through a guide tube 35 which is secured to the rear edge of the standard 25 and curves rearwardly therefrom at 36 at the bottom of the standard behind the tool 28. A rotatable shieve 37 is mounted at the upper end of the guide tube 35 to facilitate the cable to enter the tube without damage to the cable armor or insulation.

The implement frame 11 is supported on a wheeled truck 40 which comprises a U-shaped crank axle 41 having a transversely extending bearing portion 42, the opposite ends of which are bent to form crank axle portions 43, 44, respectively. A ground wheel 45 is journaled at the end of each of the crank axles 43, 44. The bearing portion 42 of the U-shaped crank axle 41 is journaled on the longitudinal draft frame by means which will now be described. Journaled in a pair of transversely aligned journal bearings 50, 51, each of which is secured to its respective beam by a pair of bolts 52, 53, respectively, is a sleeve member 54 comprising a pair of cooperating halves rigidly secured together by bolts 55 at either end thereof, which are extended through aligned apertures formed in raised portions 56 at either end of the sleeve. The raised portions 56 serve as thrust bearings to prevent the sleeve from sliding axially in the journal bearings 50, 51. The inner opening of the sleeve 54 is square in cross section and is slightly larger than the bearing portion 42 of the square crank axle 41. Thus the sleeve 54 is free to slide axially along the bearing portion 42, but is not free to rotate relative to the latter. An arm or lever 57 is rigidly fixed to the sleeve 54 and extends radially outwardly from the sleeve between the two journal bearings 50, 51. This arm 57 provides a connection between depth adjusting mechanism mounted on the frame 11, which will be described presently, and the crank axle 41. The sleeve is also clamped to the axle 41 by a U-bolt 58 which has nuts 59 engaging suitable lugs on the upper half of the sleeve and passes under the lower half.

The depth adjusting mechanism includes a pair of bars 60 pivotally connected to the end of the arm 57 by a pin 61. The bars 60 are disposed parallel to each other and spaced apart by a pair of blocks 62 and the bars 60 and blocks 62 are riveted together to form a unitary member. An adjusting screw 63 is journaled at opposite ends thereof in the blocks 62 and the forward end of the screw 63 is bent to provide a hand crank 64 for rotating the screw 63 in the journal blocks 62. A detent member 65 is provided with a threaded aperture through which the screw 63 extends. The detent member 65 is in the form of a short bar disposed transversely and bearing upon the two parallel bars 60. Thus by turning the hand crank 64 the detent member 65 is moved longitudinally of the bars 60.

The bars 60 and screw 63 extend forwardly from the end of the arm 57 between a pair of vertical standard members 66, 67 which are secured by bolts 68 to the frame beams 12, 13, respectively. The standards 66, 67 are held in spaced apart relation by sleeves 69 disposed on the connecting bolts 70 and the lower ends of the standards are braced by means of an angle member 71 connected between the beams 12, 13. The standards 66, 67 are braced against fore and aft tilting movement by means of diagonal braces 72, 73. The implement is held in raised or transport position, as shown in Figure 1, by locking means which includes a locking bar 75 supported in vertical position midway between the standards 66, 67, and spaced therefrom by spacing sleeves 76 disposed on the two lower bolts 70, 77. Engaging the upper end of the locking bar 75 is a roller 78 mounted on a bolt 79 and supported transversely between the bars 60.

When the crank axle 41 is swung downwardly to raise the frame 11, the arm 57 is swung forwardly and the bars 60 are pushed forwardly between the standards 66, 67 and slide on a transverse bolt 70. When the roller 78 encounters the locking bar 75, it rolls upwardly over an inclined surface 80 at the upper end thereof and raises the bars 60 and screw 63 about the pin 61 until the roller 78 drops in front of the locking bar 75, the latter holding the roller 78 against rearward movement through the standards 66, 67 and thereby preventing the crank axle 41 from swinging upwardly to lower the frame. The frame is dropped to working position by means of a releasing lever 85 supported at its lower end in a journal 86 on the frame 11, and has an arm 87 connected thereto. A pair of vertically extending links 88 are pivotally connected by a bolt 89 to the outer end of the arm 87 and the upper end of the links 88 are connected by a bolt 91 to a link 90, which is pivoted on the bolts 70. By swinging the hand lever 85 forwardly, the vertical links 88 are raised and engage the bars 60 by means of a sleeve 91' on the bolt 91 to raise the bars about their pivot connection 61 to free the roller 78 from the upper end of the locking bar 75, after which the weight of the frame causes the latter to drop and swing the crank axle 41 forwardly.

The frame 11 is shifted laterally with respect to the whels 45 by means of a screw 95 in the form of a rod threaded throughout its length and journaled at opposite ends thereof in a yoke 96 which has a pair of upwardly turned ends 97, 98 in each of which is an upwardly facing slot 99. The bearing portion 42 of the crank axle 41 is provided with a pair of spaced reduced sections 100 turned down to a circular cross section and which are received by the slots 99 in the ends 97, 98 of the yoke 96. A pair of slotted retaining members 101 formed in inverted U-shape are adapted to fit over the top of the reduced sections 100 and are bolted by means of bolts 102 to the yoke ends 97, 98, respectively, to secure the yoke to the rock shaft 42. Thus the yoke 96 is journaled on the rock shaft 42 for relative rotation but is prevented from sliding axially along the rock shaft by the shoulders adjacent the reduced sections 100. The yoke 96 is slidably connected to the frame beams 12, 13 by means of a pair of straps 103, 104, bolted to the bottoms of the beams by bolts 105. A pair of nuts 106, 107 are fixed to opposite ends of the screw 95, respectively, for the purpose of holding the latter against lateral movement in the yoke 96. One of the nuts 107 is rigidly fixed, as by welding, to the screw 95 and the other nut 106 is detachably threaded on the screw 95 and fixed thereto by means of a pin 108 extending through aligned apertures in the nut and screw. The screw 95 extends through openings 109, 110 in the beams 12, 13, respectively, and engages a nut member 111 disposed between the beams in the slot 14. The nut 111 is prevented from rotating relative to the beams with the result that when the screw 95 is rotated, the nut 111 is shifted laterally along the screw carrying with it the frame beams 12, 13. As the frame beams 12, 13 are shifted laterally, the sleeve 54 slides along the rock shaft 42, but at any point of adjustment of the frame relative to the wheels the rock shaft 42 can be controlled angularly by means of the arm 57 attached to the sleeve 54.

Figure 3:
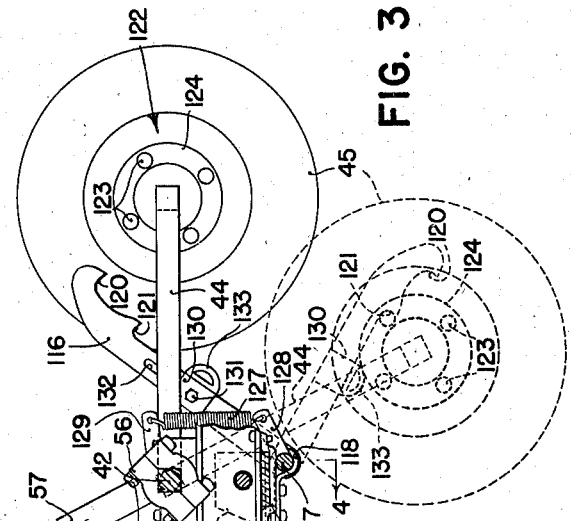
Figure 3 is a partial elevational view taken in section, showing in solid lines the position of the crank axle and wheel relative to the draft beam, and showing in dotted lines the position of the crank axle wheel and lifting mechanism at the moment just before the lifting mechanism is disengaged from the wheel.
Figure 2:
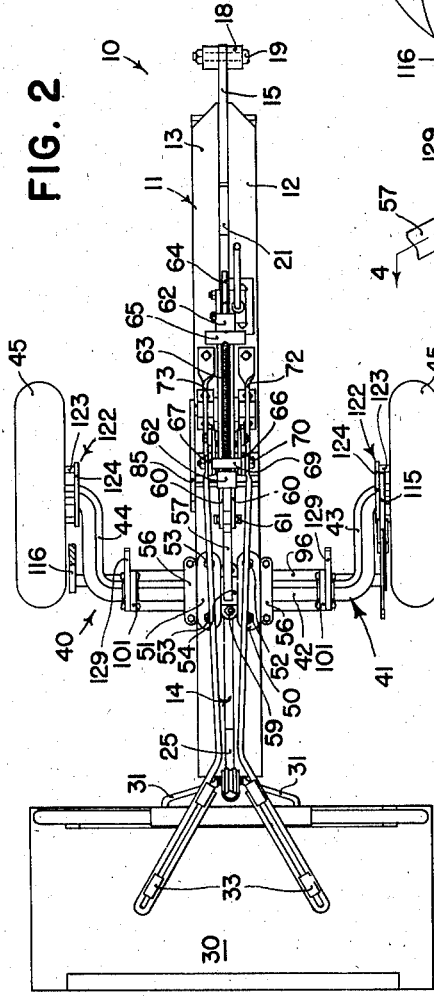
Figure 2 is a plan view of the cable laying implement.
Figure 4:
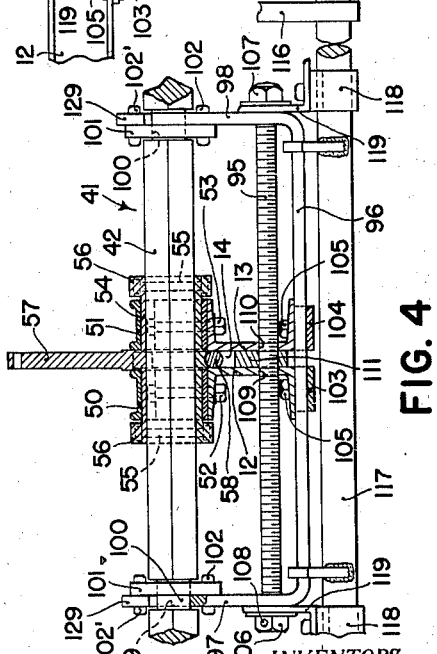
Figure 4 is a sectional elevational view taken along a line 4—4 in Figure 3.

The frame is raised to transport position by means of a pair of rack arms 115, 116 rigidly mounted on a rock shaft 117 which is journaled in suitable bearing means 118 secured to a pair of angle brackets 119 which are fixed to the ends of the yoke 96. Each of the rack arms 115, 116 is provided with a pair of hook portions 120, 121 which are adapted to engage a rack ring 122 supported on each of the wheels 45. Each rack ring 122 comprises a number of stud bolts 123 secured to the hub of the wheel 45 and evenly spaced about the axis of the wheel. The ends of the studs 123 are connected by a ring 124 disposed coaxially with the wheel 45. To raise the frame the rack arms 115, 116 are swung downwardly by means of a handle 126 fixed to one of the rack arms 115, until the outer hook 120 engages one of the studs 123. As best illustrated in Figure 3, the rack arm is pulled forwardly as the wheel rotates during forward travel, causing the frame to swing upwardly on the crank axle 41. The inner hook 121 engages the following stud and continues the upward swinging movement of the frame until the latter is locked in raised position by the roller 73 engaging in front of the lock bar 75. At this point it is necessary to disengage the hook 121 from the stud 123 and this is accomplished by means of a kick-off lug 130 mounted on each of the arms 115, 116 by means of a bolt 131 which extends through a slot 132 in each of the arms. The kick-off lug 130 engages the ring 124 and further movement of the wheel 45 causes the lug 130 to pry the hook 121 loose from the stud 123. The arms 115, 116 are then raised by a pair of springs 127 connected to a pair of arms 128 on the rock shaft 117 on each side of the frame 11 and anchored at their upper ends on bars 129 fixed on the retainers 101 by bolts 102'. It is necessary that the frame be completely locked in raised position before the hook is disengaged from the stud and it is also desirable that the disengagement should take place promptly after the frame is locked up. Therefore, the adjustable connection of the lug on the rack arm is provided so that the kick-off operation can be adjusted to exactly the proper time. It will be understood that adjusting the lug outwardly on the arm will cause the arm to be disengaged sooner, and conversely adjusting the lug inwardly on the arm causes a later disengagement thereof. The contacting surface 133 of the lug 130 is arcuate in form to provide a rolling action of the lug on the ring 124 as the hook 121 is disengaged from the stud 123.

A rolling colter 135 is provided on the frame 11 ahead of the tool standard 25 to facilitate passage of the latter by cutting through the sod or any brush or trash lying on the ground. The colter 135 is journaled on arm 136 fixed to a standard 137 which extends upwardly through the slot 14 between the frame beams 12, 13. The colter is adjusted vertically by means of an adjusting screw 138 which threads into a plate 139 fixed to the top of the beam 12, and the upper end of the screw is journaled in a bearing 140 supported in a head 141 fixed to the upper end of the standard 137. An adjusting handle 142 is attached to the upper end of the screw 138 for rotating the latter manually.

We do not intend our invention to be limited to the specific details shown and described herein except as limited by the claims which follow.

We claim:

1. An implement comprising a draft frame, a ground engaging tool mounted thereon, a supporting truck therefor including a U-shaped crank axle structure having a transverse bearing portion and a pair of laterally spaced cranks rigidly fixed thereto, a wheel journaled on each of said cranks, means swingably supporting said bearing portion on said frame providing for lateral adjustment of said frame toward either of said cranks, depth adjusting mechanism mounted on said frame, and means slidably mounted on said bearing portion but non-rotatable relative thereto for operatively connecting said mechanism with said crank axle structure.

2. An implement comprising a draft frame, a ground engaging tool mounted thereon, a supporting truck therefor including a transverse supporting member, a U-shaped crank axle having a transverse bearing portion journaled on said supporting member and a pair of laterally spaced cranks rigidly fixed thereto, a wheel journaled on each of said cranks, means connecting said frame to said transverse supporting member intermediate of said wheels including means for adjustably fixing said frame thereto selectively in any of a plurality of positions offset laterally toward either of said wheels, depth adjusting mechanism mounted on said frame, and a slidable connection on said transverse bearing portion adapted to slide laterally when said frame is adjusted laterally, for operatively connecting said mechanism to said crank axle.

3. An implement comprising a draft frame, a ground engaging tool mounted thereon, a supporting truck therefor including a transverse supporting member, a U-shaped crank axle having a transverse bearing portion journaled on said supporting member and a pair of laterally spaced cranks rigidly fixed thereto, a wheel journaled on each of said cranks, means connecting said frame to said transverse supporting member intermediate of said wheels including an adjusting screw rotatably supported on said supporting member and a cooperative threaded member on said frame for shifting the latter toward either of said wheels to offset operating position, depth adjusting mechanism mounted on said frame and a slidable connection on said transverse bearing portion adapted to slide laterally when said frame is adjusted laterally, for operatively connecting said mechanism to said crank axle.

4. An implement comprising a draft frame, a ground engaging tool mounted thereon, a crank axle having a transverse supporting portion journaled on said frame for swinging movement in a vertical plane by means providing for lateral shifting of said frame relative thereto and a wheel supporting crank fixed to said supporting portion, means operative to shift said frame along said crank axle supporting portion and to fix said frame to said crank axle portion in adjusted position, depth adjusting control means mounted on said frame, and a depth control arm nonrotatably mounted on said crank axle but slidable thereon with said frame, said arm being connected to said control means.

5. In an implement of the class described, a draft frame, a pair of transversely aligned journal bearings fixed to said frame, a sleeve rotatably mounted in said bearings, a transverse rock shaft slidable axially through said sleeve but having means preventing rotation therein, a pair of cranks fixed at opposite ends of said shaft, a supporting wheel journaled at the end of each of said cranks, means for adjustably fixing said frame in various laterally spaced positions with respect to said rock shaft, a depth adjusting device mounted on said frame, and an arm fixed to said sleeve and connected with said adjusting device.

6. In an implement of the class described, a draft frame, a pair of transversely aligned journal bearings fixed to said frame, a sleeve rotatably mounted in said bearings, a transverse rock shaft slidable axially through said sleeve but having means preventing rotation therein, a pair of cranks fixed at opposite ends of said shaft, a supporting wheel journaled at the end of each of said cranks, a transverse member journaled on said rock shaft at opposite sides of said frame, an adjusting screw rotatably supported on said transverse member and extending through a threaded nut on said frame, whereby the latter can be shifted laterally relative to said rock shaft by rotating said screw, a depth adjusting mechanism mounted on said frame, and an arm fixed to said sleeve and connected with said adjusting mechanism.

7. In an implement of the class described, a draft frame, a pair of transversely aligned spaced journal bearings fixed to said frame, a sleeve journaled in said aligned bearings, an arm fixed to said sleeve and disposed between said bearings, a rock shaft slidable axially within said sleeve but held against rotation relative thereto, a pair of crank axles fixed to said rock shaft at opposite ends thereof, a supporting wheel journaled on each of said crank axles, and mechanism mounted on said draft frame and connected to said arm for adjustably fixing said crank axles in different positions of angular adjustment relative to said frame.

8. In an implement of the class described, a draft frame comprising a pair of longitudinally extending beams disposed adjacent each other and rigidly connected together with spacing means to provide a slot therebetween, a pair of transversely aligned spaced journal bearings fixed to said beams, respectively, a sleeve journaled in said aligned bearings, an arm fixed to said sleeve and disposed between said bearings, a rock shaft slidable axially within said sleeve but held against rotation relative thereto, a pair of crank axles fixed to said rock shaft at opposite ends thereof, a supporting wheel journaled on each of said crank axles, and a screw extending transversely of said frame and engaging a nut carried in the slot between said beams, means for rotatably supporting said screw on said rock shaft and for preventing axial movement relative thereto, whereby said frame can be adjusted toward either of said wheels, and means connected to said arm for fixing the angular position of said crank axles relative to said frame.

9. In an implement of the class described, a draft frame comprising a pair of longitudinally extending beams disposed adjacent each other and rigidly connected together with spacing means to provide a slot therebetween, a pair of transversely aligned spaced journal bearings fixed to said beams, respectively, a sleeve journaled in said aligned bearings, an arm fixed to said sleeve and disposed between said bearings, a rock shaft slidable axially within said sleeve but held against rotation relative thereto, a pair of crank axles fixed to said rock shaft at opposite ends thereof, a supporting wheel journaled on each of said crank axles, a screw extending transversely through aligned apertures in said beams and engaging a nut carried in the slot between said beams, a yoke for rotatably supporting the ends of said screw and slidable transversely relative to said frame, means supporting said yoke at opposite ends thereof on said rock shaft, said supporting means providing for rocking movement of said shaft relative to said yoke but preventing axial sliding movement relative thereto, said screw acting against said nut and reacting against said yoke to move said frame laterally relative to said wheels, and depth control mechanism mounted on said frame and connected with said arm for adjusting said crank axles relative to said frame.

10. A cable laying implement comprising a longitudinally extending draft beam, a tool carrying standard fixed thereto, a cable reel platform carried on said beam, a cable guide extending down the rear of said standard, a wheeled truck for supporting said beam including a transverse rock shaft journaled on said beam by means providing for lateral shifting movement relative thereto, a pair of crank axles fixed to said rock shaft at opposite ends thereof, respectively, and swingable vertically as said rock shaft is rocked, a wheel journaled on each of said crank axles, an arm mounted on said rock shaft for rocking the latter and slidable laterally thereon, and adjusting mechanism mounted on said beam and connected to said arm for angularly adjusting said crank axles relative to said beam.

11. A cable laying implement comprising a longitudinally extending draft beam, a tool carrying standard fixed thereto, a cable reel platform carried on said beam, a cable guide extending down the rear of said standard, a wheeled truck for supporting said beam including a transverse rock shaft journaled on said beam by means providing for lateral shifting movement relative thereto, a pair of crank axles fixed to said rock shaft at opposite ends thereof, respectively, and swingable vertically as said rock shaft is rocked, a wheel journaled on each of said crank axles, an arm mounted on said rock shaft for rocking the latter and slidable laterally thereon, depth limiting mechanism mounted on said beam and connected to said arm for limiting the extent of upward swinging movement of said crank axles, a control rock shaft rockably supported on said axle supporting rock shaft and shiftable laterally therewith relative to said beam, and a rack arm supported on said control rock shaft and swingable into engagement with one of said wheels to swing said crank axles relative to said beam as the implement advances.

12. In an implement of the class described, a longitudinally extending draft beam, a wheeled truck for supporting said beam including a transverse rock shaft journaled on said beam by means providing for lateral shifting movement relative thereto, a pair of crank axles fixed to said rock shaft at opposite ends thereof, respectively, and swingable vertically as said rock shaft is rocked, a wheel journaled on each of said crank axles, an arm mounted on said rock shaft for rocking the latter and slidable laterally thereon, depth limiting mechanism mounted on said beam and connected to said arm for limiting the extent of upward swinging movement of said crank axles, the transverse member journaled on said rock shaft on opposite sides of said beam and shiftable laterally relative thereto, a second rock shaft journaled on said transverse member, a rack arm supported on said second rock shaft and swingable into engagement with one of said wheels to swing said crank axles relative to said beam as the implement advances, the detent means for locking said beam in raised position relative to said crank axles.

13. In an implement of the class described, a longitudinally extending draft beam, a wheeled truck for supporting said beam including a transverse supporting member, a transverse rock shaft journaled on said member and on said beam by means providing for lateral shifting movement relative thereto, a pair of crank axles fixed to said rock shaft at opposite ends thereof, respectively, and swingable vertically as said rock shaft is rocked, a wheel journaled on each of said crank axles, an arm mounted on said rock shaft for rocking the latter and slidable laterally thereon, depth limiting mechanism mounted on said beam and connected to said arm for limiting the extent of upward swinging movement of said crank axles, a rack arm supported on said second rock shaft and swingable into engagement with one of said wheels to swing said crank axles relative to said beam as the implement advances.

14. An implement of the class described comprising a tool carrying frame, a supporting truck therefor including a crank axle of square cross section and a wheel rotatably carried thereon, means connecting said crank axle to said frame including a sleeve having a square opening adapted to slidably receive said crank axle, the outer surface of said sleeve being journaled in bearing means fixed to said frame, an arm fixed to said sleeve, and adjusting mechanism on said frame connected to said arm.

15. An implement comprising a draft frame, a ground engaging tool mounted thereon, a supporting truck therefor including a U-shaped crank axle structure having a transverse bearing portion of rectangular cross section and a pair of laterally spaced cranks rigidly fixed thereto, a wheel journaled on each of said cranks, means swingably supporting said bearing portion on said frame providing for lateral adjustment of said frame toward either of said cranks, a sleeve having a rectangular opening adapted to slidably receive said bearing portion, bearing means fixed to said frame for rotatably supporting said sleeve, an arm fixed to said sleeve, and adjusting mechanism on said frame connected to said arm.

16. In an implement of the class described, a draft frame, a pair of transversely aligned journal bearings fixed to said frame, a transversely disposed sleeve journaled in said bearings and having a rectangular opening therein, a rock shaft of rectangular cross section slidable axially through said sleeve, a pair of cranks fixed at opposite ends of said shaft, a supporting wheel journaled at the end of each of said cranks, means for adjustably fixing said frame in various laterally spaced positions with respect to said rock shaft, a depth adjusting device mounted on said frame, and an arm fixed to said sleeve and connected with said adjusting device.

17. In an implement of the class described, a draft frame comprising a pair of longitudinally extending beams disposed adjacent each other and rigidly connected together with spacing means to provide a slot therebetween, a pair of transversely aligned spaced journal bearings fixed to said beams, respectively, a sleeve journaled in said aligned bearings, said sleeve having a rectangular opening extending axially therethrough, an arm fixed to said sleeve and disposed between said bearings, a rock shaft of rectangular cross section slidable axially within said sleeve, a pair of crank axles fixed to said rock shaft at opposite ends thereof, a supporting wheel journaled on each of said crank axles, a screw extending transversely of said frame and engaging a nut carried in the slot between said beams, means for rotatably supporting said screw on said rock shaft and for preventing axial movement relative thereto, whereby said frame can be adjusted toward either of said wheels, and means connected to said arm for fixing the angular position of said crank axles relative to said frame.

THOMAS M. THOMAS.
C. HEROLD RUSSELL.
OSCAR P. ROBB.